(12) United States Patent
Lee et al.

(10) Patent No.: US 9,705,645 B2
(45) Date of Patent: Jul. 11, 2017

(54) METHOD FOR PERFORMING HARQ FOR DEVICE-TO-DEVICE COMMUNICATION IN WIRELESS COMMUNICATION SYSTEM AND DEVICE FOR SAME

(71) Applicant: LG ELECTRONICS INC., Seoul (KR)

(72) Inventors: Seungmin Lee, Anyang-si (KR); Hanbyul Seo, Anyang-si (KR); Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/389,249

(22) PCT Filed: Apr. 18, 2013

(86) PCT No.: PCT/KR2013/003290
§ 371 (c)(1),
(2) Date: Sep. 29, 2014

(87) PCT Pub. No.: WO2013/157865
PCT Pub. Date: Oct. 24, 2013

(65) Prior Publication Data
US 2015/0063247 A1    Mar. 5, 2015

Related U.S. Application Data

(60) Provisional application No. 61/635,271, filed on Apr. 18, 2012.

(51) Int. Cl.
*H04L 1/18* (2006.01)
*H04L 5/00* (2006.01)
(Continued)

(52) U.S. Cl.
CPC .......... *H04L 1/1887* (2013.01); *H04L 1/1812* (2013.01); *H04L 1/1854* (2013.01);
(Continued)

(58) Field of Classification Search
CPC ... H04L 1/1812; H04L 1/1854; H04L 1/1887; H04L 5/003; H04W 72/042; H04W 72/1278; H04W 92/18
(Continued)

(56) References Cited

U.S. PATENT DOCUMENTS

2008/0069033 A1    3/2008  Li et al.
2008/0077837 A1    3/2008  Lohr et al.
(Continued)

FOREIGN PATENT DOCUMENTS

CN    101155392 A    4/2008
CN    101174878 A    5/2008
(Continued)

*Primary Examiner* — Huy D Vu
*Assistant Examiner* — Nizam Ahmed
(74) *Attorney, Agent, or Firm* — Birch, Stewart, Kolasch & Birch, LLP

(57) ABSTRACT

Disclosed in the present application is a method for performing HARQ for device-to-device communication by a first user equipment in a wireless communication system. Particularly, the method comprises: receiving scheduling information for signal transmission from an eNode B to a second user equipment; transmitting data to the specific user equipment in a first subframe according to the scheduling information; and transmitting the data or new data to the second user equipment in a third subframe according to a response signal to the data, wherein the response signal is transmitted from the second UE to the eNode B in a second subframe positioned between the first subframe and the third subframe, and an interval between the first subframe and the third subframe, which is an HARQ period for the device-to-device communication, is set as a power number of an HARQ period between the first user equipment and the eNodeB.

8 Claims, 15 Drawing Sheets

(51) Int. Cl.
 *H04W 72/04* (2009.01)
 *H04W 72/12* (2009.01)
 *H04W 92/18* (2009.01)

(52) U.S. Cl.
 CPC ........... *H04L 5/003* (2013.01); *H04W 72/042* (2013.01); *H04W 72/1278* (2013.01); *H04L 5/0053* (2013.01); *H04W 92/18* (2013.01)

(58) Field of Classification Search
 USPC ........................................................ 370/329
 See application file for complete search history.

(56) References Cited

U.S. PATENT DOCUMENTS

| | | | |
|---|---|---|---|
| 2010/0131814 A1* | 5/2010 | Chiu ..................... | H04L 1/1822 714/748 |
| 2010/0135238 A1 | 6/2010 | Sadri et al. | |
| 2010/0136997 A1* | 6/2010 | Palanki ................ | H04W 88/04 455/452.1 |
| 2011/0171990 A1 | 7/2011 | Jin et al. | |
| 2015/0009932 A1* | 1/2015 | Choi ........................ | H04L 1/16 370/329 |

FOREIGN PATENT DOCUMENTS

| | | |
|---|---|---|
| JP | 2010-283843 A | 12/2010 |
| KR | 10-2011-0083488 A | 7/2011 |
| WO | WO 2011/051745 A1 | 5/2011 |
| WO | WO 2012/047928 A1 | 4/2012 |

* cited by examiner

FIG. 2
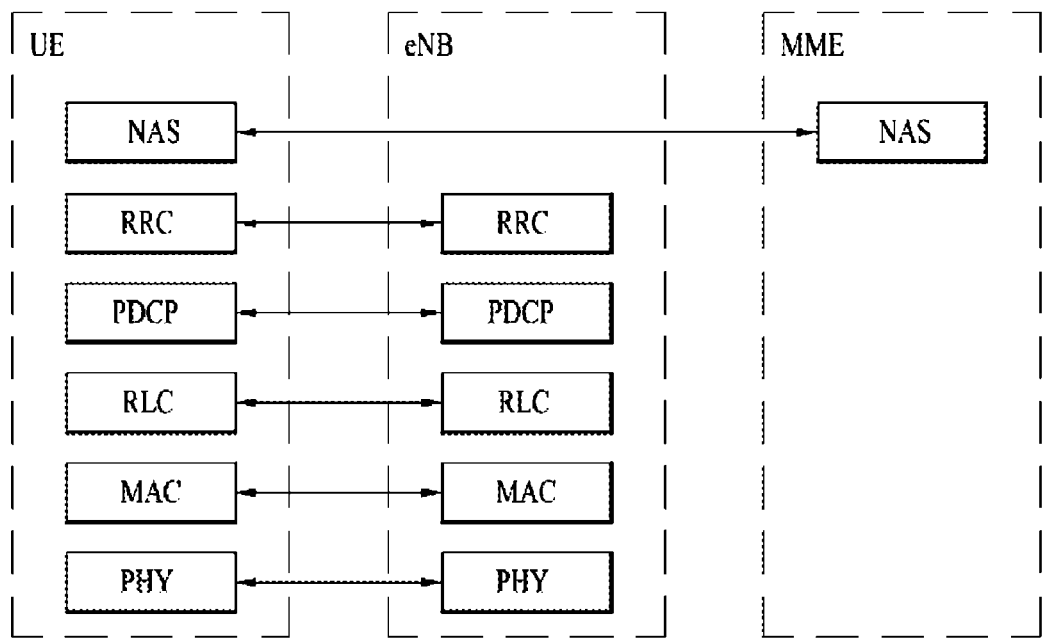
(a) Control-Plane Protocol Stack
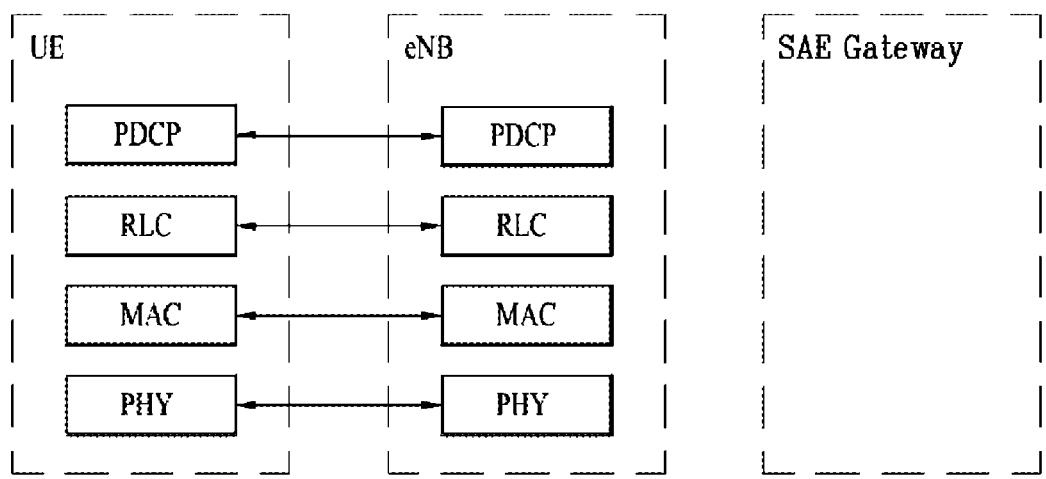
(b) User-Plane Protocol Stack

METHOD FOR PERFORMING HARQ FOR DEVICE-TO-DEVICE COMMUNICATION IN WIRELESS COMMUNICATION SYSTEM AND DEVICE FOR SAME

CROSS REFERENCE TO RELATED APPLICATIONS

This application is the National Phase of PCT International Application No. PCT/KR2013/003290, filed on Apr. 18, 2013, which claims priority under 35 U.S.C. 119(e) to U.S. Provisional Application No. 61/635,271, filed on Apr. 18, 2012, all of which are hereby expressly incorporated by reference into the present application.

FIELD OF THE INVENTION

The present invention relates to a wireless communication system and, most particularly, to a method for performing HARQ for device-to-device communication in a wireless communication system and a device for the same.

BACKGROUND ART

As an example of a communication system to which the present invention may be applied, a 3GPP LTE (3$^{rd}$ Generation Partnership Project Long Term Evolution; hereinafter referred to as "LTE") communication system will now be broadly described.

FIG. 1 illustrates a general view of an E-UMTS network structure as an example of a communication system. Herein, the E-UMTS (Evolved Universal Mobile Telecommunications System) corresponds to a system evolved from the conventional UMTS (Universal Mobile Telecommunications System). The 3GPP is presently carrying out a basic standardization process for the E-UMTS. Generally, the E-UMTS may also be referred to as an LTE system. For details of the technical specifications of the UMTS and the E-UMTS, reference may be made to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG), which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.44, 3, 5, 10, 15, and 20 Mhz to provide a downlink or uplink transport service to several user equipments. Different cells may be set to provide different bandwidths. Also, one base station controls data transmission and reception for a plurality of user equipments. The base station transmits Downlink (DL) scheduling information of downlink data to the corresponding user equipment to notify information related to time and frequency domains to which data will be transmitted, encoding, data size, and HARQ (Hybrid Automatic Repeat and reQuest). Also, the base station transmits Uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a TA (Tracking Area) unit basis, wherein one TA unit includes a plurality of cells.

The wireless communication technology has been developed up to the LTE based upon WCDMA. However, the demands and expectations of the users and the manufacturers and providers are growing continuously. Also, since other wireless access technologies are constantly being developed, the wireless communication technology is required to newly evolve in order to ensure competitiveness in the future. Accordingly, characteristics, such as reduced cost for each bit, extended service availability, usage of a flexible frequency band, simple structure and open interface, and adequate power consumption of the user equipment are being requested.

DETAILED DESCRIPTION OF THE INVENTION

Technical Objects

Based upon the above-described discussion, a method for performing HARQ for device-to-device communication in a wireless communication system and a device for the same will hereinafter be proposed.

Technical Solutions

A method of a first user equipment for performing HARQ (Hybrid Automatic Repeat and reQuest) for device-to-device communication in a wireless communication system according to an exemplary embodiment of the present invention includes a step of receiving scheduling information for performing signal transmission to a second user equipment from a base station; a step of transmitting data on a first subframe to the specific user equipment in accordance with the scheduling information; and a step of transmitting the data or new data on a third subframe to the second user equipment in accordance with a response signal respective to the data, wherein the response signal is transmitted by the second user equipment to the base station on a second subframe being located between the first subframe and the third subframe, and wherein a interval between the first subframe and the third subframe, the interval corresponding to an HARQ cycle period of the device-to-device communication, is set to be equal to a multiple of an HARQ cycle period between the first user equipment and the base station.

Preferably, the base station transmits scheduling information for reception of the data on a fourth subframe to the second user equipment.

More preferably, the second subframe may correspond to an uplink subframe interconnected to a nearest downlink subframe after the first subframe in a HARQ process interconnected to the first subframe.

Alternatively, the second subframe may also correspond to a nearest subframe after the first subframe. In this case, the nearest uplink subframe corresponds to an uplink subframe that is scheduled to transmit an ACK (Acknowledgement)/NACK (Negative-ACK) signal to the base station in uplink/downlink subframe configurations configured in the first user equipment.

Alternatively, a HARQ process of the device-to-device communication has a predetermined time offset value respective to a HARQ process between the first user equipment and the base station applied thereto. Herein, the predetermined time offset corresponds to a half of a HARQ cycle period of the device-to-device communication.

Meanwhile, the method may further include a step of receiving information related to the uplink/downlink subframe configurations for the device-to-device communication from the base station. In this case, an uplink subframe collection of the uplink/downlink subframe configurations for the device-to-device communication is included in or identical to an uplink subframe collection of the uplink/downlink subframe configurations for the device-to-base station communication. Additionally, the information related to the uplink/downlink subframe configurations for the device-to-base station communication is predetermined in advance through system information.

Advantageous Effects

According to the exemplary embodiment of the present invention, an HARQ process may be efficiently performed for device-to-device communication in a wireless communication system.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

FIG. 2 illustrates a Control Plane structure and a User Plane structure of a Radio Interface Protocol between a user equipment and the E-UTRAN based upon the 3GPP radio access network standard.

BEST MODE FOR CARRYING OUT THE PRESENT INVENTION

Figure 1:
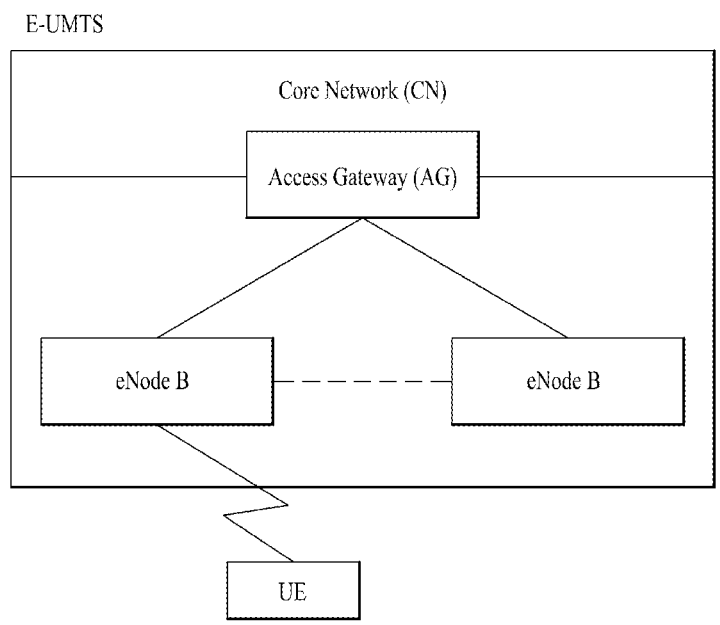
FIG. 1 illustrates a general view of an E-UMTS network structure as an example of a wireless communication system.

Hereinafter, reference will now be made in detail to the preferred embodiments of the present invention, examples of which are illustrated in the accompanying drawings. The detailed description of the present invention is provided to facilitate the understanding of the configuration, operation, and other characteristics of the present invention. The following embodiments of the present invention correspond to examples wherein the technical features of the present invention are applied in the 3GPP system.

The description of the present invention will describe the embodiments of the present invention by using the LTE system and the LTE-A system. However, this is merely exemplary, and, therefore, the present invention may be applied to any other corresponding to the above-described definition. Also, the description of the present invention will also describe the embodiments of the present invention based upon an FDD method. However, this is also merely exemplary, and, therefore, the present invention may also be easily modified and applied to an H-FDD (Hybrid-FDD) method or a TDD (Time Division Duplex) method.

FIG. 2 illustrates a Control Plane structure and a User Plane structure of a Radio Interface Protocol between a user equipment and the E-UTRAN based upon the 3GPP radio access network standard. A control plane refers to a path through which control messages are transmitted. Herein, the control messages are used by the User Equipment (UE) and network in order to manage a unit. And, a user plane refers to a path through which data generated from an application layer are transmitted. Such data may include audio data or Internet packet data, and so on.

A first layer, which corresponds to a physical layer, uses a physical channel to provide an Information Transfer Service to a higher layer. The physical layer is connected to a Medium Access Control layer, which corresponds to a higher layer, through a Transport Channel. And, herein, data is transported between the Medium Access Control layer and the physical layer through the Transport Channel (Trans Antenna Port Channel). In a data transmission between a physical layer of the transmitting end and a physical layer of the receiving end, data are transported between the physical layers through a physical channel. Herein, the physical layer uses time and frequency as radio resource. More specifically, in a downlink, the physical channel is modulated by using an OFDMA (Orthogonal Frequency Division Multiple Access) scheme, and, in an uplink, the physical channel is modulated by using an SC-FDMA (Single Carrier Frequency Division Multiple Access) scheme.

A Medium Access Control (MAC) layer of a second layer provides services to a Radio Link Control (RLC) layer, which corresponds to higher layer, through a logical channel. The Radio Link Control (RLC) layer of the second layer supports the transmission of reliable data. The function of the RLC layer may also be realized by a functional block within the MAC. A PDCP (Packet Data Convergence Protocol) layer of the second layer performs a header compression function, which can reduce unnecessary control information in order to efficiently transmit IP packets, such as IPv4 or IPv6, in a wireless (or radio) interface having a narrow bandwidth.

A radio resource control (RRC) layer which is positioned in a lowermost portion of a third layer is defined only in the control plane. And, in relation with the configuration, re-configuration, and release of radio bearers (RBs), the RRC layer performs the role of controlling the logical channels, the transmission channels, and the physical channels. The Radio Bearer refers to a service that is provided by the second layer in order to deliver (or transport) data between the UE and the network. In order to do so, the RRC layers of the UE and the network exchanges RRC messages to and from one another. If an RRC connection exists between the RRC layer of the UE and the RRC layer of the network, the user equipment is in an RRC Connected Mode. And, if not, the user equipment is in an RRC Idle Mode. An NAS (Non-Access Stratum) layer, which is located above the RRC layer performs the roles of Session Management and Mobility Management.

One cell that configures a base station (eNB) is set to one of bandwidths of 1.4, 3, 5, 10, 15, and 20 Mhz, thereby providing a downlink or uplink transport service to several user equipments. Different cells may be set to provide different bandwidths.

In the network, downlink transmission channels that transmit data to the UE include a BCH (Broadcast Channel), which transmits system information, a PCH (Paging Channel), which transmits paging messages, and a downlink SCH (Shared Channel), which transmits information other than the system information, such as user traffic or control messages. In case of traffic information or control messages of a downlink multicast or broadcast service, the corresponding data may be transmitted through a downlink SCH or may also be transmitted through a separate downlink MCH (Multicast Channel). Meanwhile, uplink transmission channels that transmit data from the UE to the network include a RACH (Random Access Channel), which transmits initial control messages, and an uplink SCH (Shared Channel), which transmits information other than the system information, such as user traffic or control messages. Logical Channels being in a level higher than the transmission channel and being mapped to the transmission channel include a BCCH (Broadcast Channel), a PCCH (Paging Control Channel), a CCCH (Common Control Channel), an MCCH (Multicast Control Channel), an MTCH (Multicast Traffic Channel), and so on.

Figure 3:
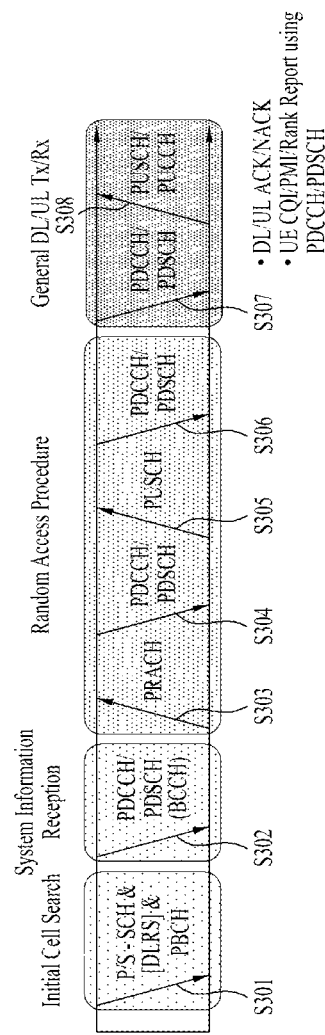
FIG. 3 illustrates physical channels that are used in the 3GPP system and a general method for transmitting signals using such physical channels.

FIG. 3 illustrates physical channels that are used in the 3GPP system and a general method for transmitting signals using such physical channels.

The user equipment performs initial cell search such as synchronization with the base station, when it newly enters a cell or when the power is turned on (S301). In order to do so, the user equipment establishes synchronization with the base station by receiving a Primary Synchronization Channel (P-SCH) and a Secondary Synchronization Channel (S-SCH) from the base station, and then acquires information such as cell ID, and so on. Thereafter, the user equipment may acquire broadcast information within the cell by receiving a Physical Broadcast Channel from the base station. Meanwhile, in the step of initial cell search, the user equipment may receive a Downlink Reference Signal (DL RS) so as to verify the downlink channel status.

Once the user equipment has completed the initial cell search, the corresponding user equipment may acquire more detailed system information by receiving a Physical Downlink Control Channel (PDCCH) and a Physical Downlink Control Channel (PDSCH) based upon the respective information carried in the PDCCH (S302).

Meanwhile, if the user equipment initially accesses the base station, or if there are no radio resources for signal transmission, the user equipment may perform a Random Access Procedure (RACH) with respect to the base station (S303 to S306). In order to do so, the user equipment may transmit a specific sequence to a preamble through a Physical Random Access Channel (PRACH) (S303 and S305), and may receive a response message respective to the preamble through the PDCCH and the PDSCH corresponding to the PDCCH (S304 and S306). In case of a contention based RACH, a Contention Resolution Procedure may be additionally performed.

After performing the above-described process steps, the user equipment may perform PDCCH/PDSCH reception (S307) and Physical Uplink Shared Channel (PUSCH)/Physical Uplink Control Channel (PUCCH) transmission (S308), as general uplink/downlink signal transmission procedures. Most particularly, the user equipment receives Downlink Control Information (DCI) through the PDCCH. Herein, the DCI includes control information, such as resource allocation information respective to the UE, and the format of the DCI may vary depending upon the purpose for using the DCI.

Meanwhile, the control information, which is transmitted by the user equipment to the base station or received by the user equipment from the base station via uplink, includes downlink/uplink ACK/NACK signals, a CQI (Channel Quality Indicator), a PMI (Precoding Matrix Index), an RI (Rank Indicator), and so on. In case of the 3GPP LTE system, the user equipment may transmit control information, such as the above-described CQI/PMI/RI through the PUSCH and/or the PUCCH.

Figure 4:
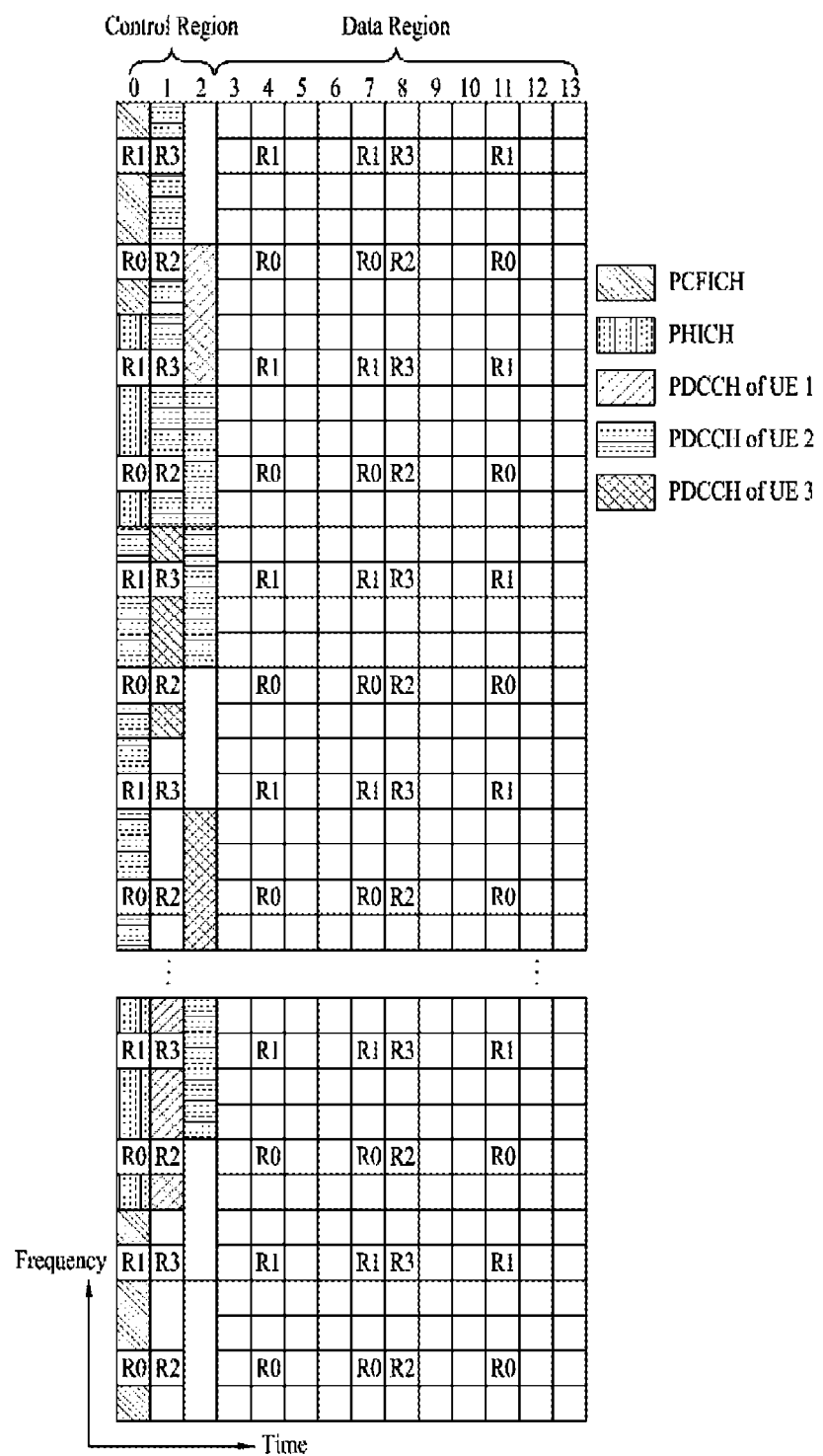
FIG. 4 illustrates a structural view of a multiple antenna communication system.

FIG. 4 illustrates an exemplary structure of a downlink radio frame that is used in the LTE system.

Referring to FIG. 4, one subframe is configured of 14 OFDM symbols. Depending upon the subframe settings, the first one (1) to three (3) OFDM symbols are used as the control region, and the remaining 13~11 OFDM symbols are used as the data region. Referring to the drawing, R1 to R4 respectively represent Reference Signals (RSs) or Pilot Signals for antennas 0 to 3. Regardless of the control region and the data region, the RS is fixed within the subframe according to a consistent pattern. A control channel is allocated to resources of the control region to which the RS is not allocated. And, a traffic channel is allocated to resources of the data region to which the RS is not allocated. Control channels that are allocated to the control region may include a PCFICH (Physical Control Format Indicator CHannel), a PHICH (Physical Hybrid-ARQ Indicator CHannel), a PDCCH (Physical Downlink Control CHannel), and so on.

As a Physical Control Format Indicator Channel, the PCFICH notifies the user equipment of the number of OFDM symbols used in the PDCCH for each subframe. The PCFICH is located in the first OFDM symbol and is configured at a higher priority level than the PHICH and the PDCCH. The PCFICH is configured of 4 REGs (Resource Element Groups), and each REG is distributed (or spread) within the control region based upon the Cell ID (Cell Identity). One REG is configured of 4 REs (Resource Elements). An RE represents a minimum physical resource defined by one subcarrier×one OFDM symbol. The PCFICH value indicates a value ranging from 1 to 3 or from 2 to 4 depending upon the bandwidth and is modulated by using QPSK (Quadrature Phase Shift Keying).

As a Physical HARQ (Hybrid-Automatic Repeat and request) Indicator Channel, the PHICH is used for delivering HARQ ACK/NACK respective to uplink transmission. More specifically, the PHICH represents a channel through which DL ACK/NACK information for UL HARQ is transmitted. The PHICH consists of one REG and is cell-specifically scrambled. An ACK/NACK is indicated by 1 bit and is modulated by using BPSK (Binary phase shift keying). The modulated ACK/NACK is distributed (or spread) by a Spreading Factor (SF)=2 or 4. A plurality of PHICH being mapped to the same resource configures a PHICH group. The number of PHICHs being multiplexed in the PHICH group is decided in accordance with the number of spreading codes. The PHICH (group) is repeated 3 times in order to obtain diversity gain in the frequency domain and/or the time domain.

As a Physical Downlink Control Channel, the PDCCH is allocated to the first n number of OFDM symbols of a subframe. Herein, n is an integer equal to or greater than 1, and n is designated by the PCFICH. The PDCCH is configured of one or more CCEs (Control Channel Elements). The PDCCH notifies each user equipment or a user equipment group of information associated to resource allocation of a PCH (Paging channel) and a DL-SCH (Downlink-shared channel), Uplink Scheduling Grant, HARQ information, and so on. The PCH (Paging channel) and the DL-SCH (Downlink-shared channel) are transmitted through the PDSCH. Therefore, with the exception for specific control information or specific service data, the base station and the user equipment generally transmit and receive data through the PDSCH.

Information on the user equipment (one user equipment or a plurality of user equipments) to which the data of the PDSCH are to be transmitted, and information on how the user equipments receive and decode the transmitted PDSCH data are included in the PDCCH and transmitted. For example, it is assumed that a specific PDCCH is processed with CRC masking with an RNTI (Radio Network Temporary Identity) "A", and it is also assumed that information on the data being transmitted by using a radio resource (e.g., frequency position) "B" and a transmission format information (e.g., transmission block size, modulation method, coding information, etc.) "C" are transmitted through a specific subframe. In this case, a user equipment within a cell uses its own RNTI so as to monitor the PDCCH. And, when one or more user equipments carries RNTI "A", the corresponding user equipments receive the PDCCH and then receive the PDSCH, which is indicated by "B" and "C", through the received PDCCH information.

Figure 5:
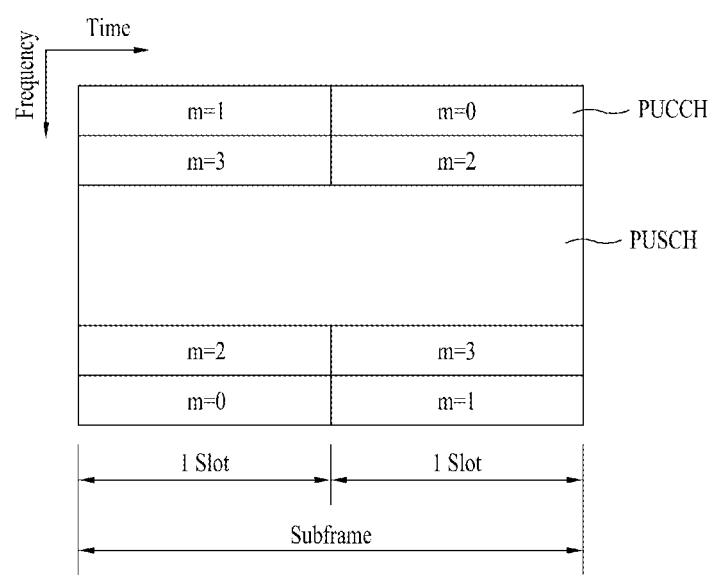
FIG. 5 illustrates an exemplary structure of an uplink radio frame that is used in the LTE system.

FIG. 5 illustrates an exemplary structure of an uplink subframe that is used in the LTE system.

Referring to FIG. 5, an uplink subframe may be divided into a region having a PUCCH (Physical Uplink Control CHannel) carrying control information allocated thereto, and a region having a PUSCH (Physical Uplink Shared CHannel) carrying user data allocated thereto. A middle portion of the subframe is allocated to the PUSCH, and both end portions of the data region within the frequency domain are allocated to the PUCCH. The control information that is transmitted over the PUCCH includes an ACK/NACK being used for the HARQ, a CQI (Channel Quality Indicator) indicating a downlink channel status, an RI (Rank Indicator) for MIMO, an SR (Scheduling Request) corresponding to an uplink resource allocation request, and so on. The PUCCH for one user equipment uses one resource block, which occupies a different frequency for each slot within the subframe. More specifically, 2 resource blocks being allocated to the PUCCH are frequency hopped at a slot boundary. Most particularly, FIG. 5 shows an example of a PUCCH wherein m=0, a PUCCH wherein m=1, a PUCCH wherein m=2, and a PUCCH wherein m=3 are allocated to the subframe.

Figure 6:
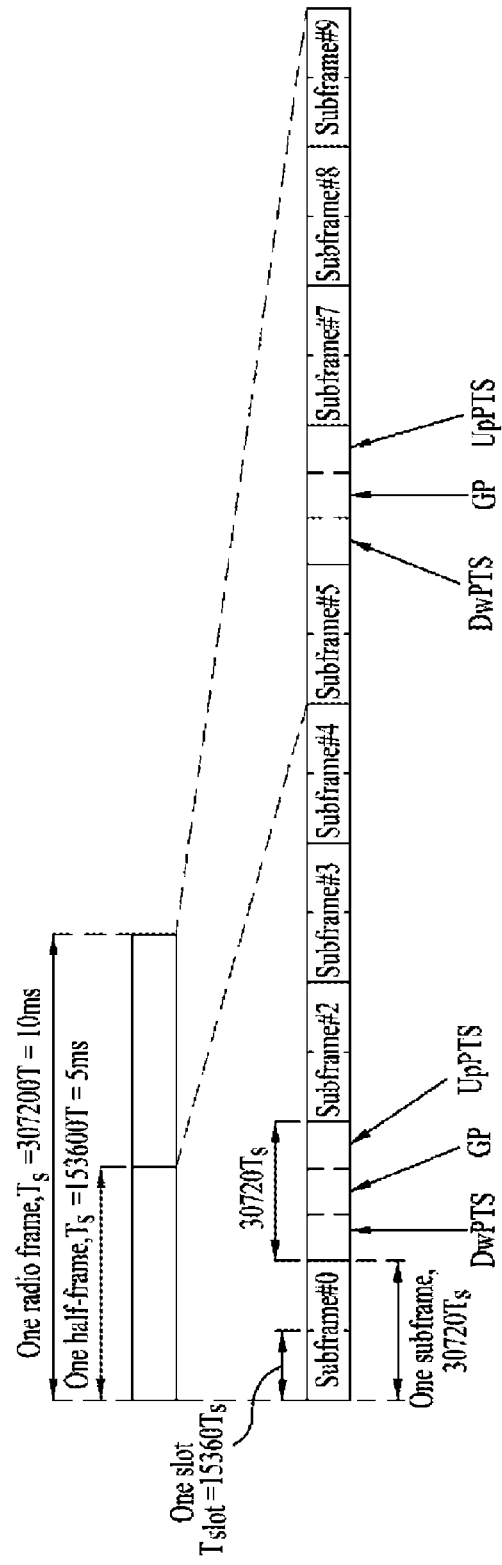
FIG. 6 illustrates an exemplary radio frame in an LTE TDD system.

FIG. 6 illustrates an exemplary radio frame in an LTE TDD system. In the LTE TDD system, a radio frame is configured of 2 half frames, each half frame consisting of 4 general subframes each including 2 slots and a special subframe including a DwPTS (Downlink Pilot Time Slot), a Guard Period (GP), and UpPTS (Uplink Pilot Time Slot).

In the special subframe, the DwPTS is used for performing initial cell search, synchronization or channel estimation in the user equipment. The UpPTS is used for matching a channel estimation performed in the based station with an uplink transmission synchronization performed in the user equipment. More specifically, the DwPTS is used for downlink transmission, and the UpPTS is used for uplink transmission, and, most particularly, the UpPTS is used for the purpose of PRACH preamble or SRS transmission. Additionally, the guard period refers to a period for eliminating (or removing) interference that occurs in an uplink, due to a multiple path delay of a downlink signal between an uplink and a downlink.

With respect to the special frame, the current 3GPP standard document defines the configuration as shown below in Table 1. Table 1 indicates DwPTS and UpPTS when $T_s=1/(15000\times2048)$, and the remaining region is determined as the guard period.

TABLE 1

| | | Normal cyclic prefix in downlink | | | Extended cyclic prefix in downlink | | |
| | | UpPTS | | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |

TABLE 1-continued

Normal cyclic prefix in downlink

| Special subframe configuration | DwPTS | UpPTS | | DwPTS | UpPTS | |
|---|---|---|---|---|---|---|
| | | Normal cyclic prefix in uplink | Extended cyclic prefix in uplink | Extended cyclic prefix in downlink | Normal cyclic prefix in uplink | Extended cyclic prefix in uplink |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | — | — | — | | |
| 8 | $24144 \cdot T_s$ | — | — | — | | |

Meanwhile, in the LTE TDD system, uplink/downlink subframe configuration (UL/DL configuration) is as shown below in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a downlink subframe, U indicates an uplink subframe, and S represents a special subframe. Herein, the special subframe includes DwPTS, GP, and UpPTS. Additionally, in Table 2, in each system, an uplink-downlink switching cycle period is also shown in the uplink/downlink subframe configuration.

Moreover, in the TDD system, a number of synchronous UL HARQ processes for each uplink/downlink subframe configuration is as shown below in Table 3.

TABLE 3

| TDD UL/DL configuration | Number of HARQ processes for Normal HARQ operation |
|---|---|
| 0 | 4 |
| 1 | 7 |
| 2 | 10 |
| 3 | 9 |
| 4 | 12 |
| 5 | 15 |
| 6 | 6 |

Additionally, Table 4 shown below indicates a PHICH timeline for each uplink/downlink subframe configuration. In Table 4, if the user equipment has transmitted the PUSCH from subframe #n based upon uplink scheduling information, e.g., an uplink (UL) grant, which is received from the base station, this indicates that an PHICH, which interoperates with the corresponding PUSCH, is received in subframe #(n+k_PHICH), and k_PHICH is given in Table 4 shown below.

TABLE 4

| TDD UL/DL Configuration | Subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Additionally, Table 5 shown below indicates a PUSCH (re-)transmission timeline, and a (re-)transmission time point of the user equipment is decided based upon conditions 1) to 4) shown below.

1) In uplink/downlink subframe configurations #1 to #6, if a PDCCH (i.e., uplink (UL) grant) and/or a PHICH are/is detected from subframe #n, the respective PUSCH transmission or re-transmission is realized in subframe #(n+k), and k is given is Table 5 shown below.

2) In uplink/downlink subframe configuration #0, if a PDCCH (i.e., uplink (UL) grant) and/or a PHICH are/is detected from subframe #n, and if an MSB (Most Significant Bit) of a UL index of an uplink grant is equal to 1, or if the PHICH is received subframe #0 or subframe #5 within a resource corresponding to $I_{PHICH}=0$, the respective PUSCH transmission or re-transmission is realized in subframe #(n+k), and, similarly, k is given is Table 5 shown below.

3) Additionally, in uplink/downlink subframe configuration #0, if a PDCCH (i.e., uplink (UL) grant) and/or a PHICH are/is detected from subframe #n, and if an LSB (Least Significant Bit) of a UL index of an uplink grant is equal to 1, or if the PHICH is received subframe #0 or subframe #6 within a resource corresponding to $I_{PHICH}=1$, the respective PUSCH transmission or re-transmission is realized in subframe #(n+7).

4) Finally, in uplink/downlink subframe configuration #0, both the MSB and LSB of the UL index are equal to 1, the respective PUSCH transmission or re-transmission is realized in subframe #(n+k) and subframe #(n+7), and, similarly, k is given is Table 5 shown below.

TABLE 5

| TDD UL/DL Configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |

TABLE 5-continued

| TDD UL/DL Configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | | 7 | 7 | | 5 |

Additionally, Table 6 shown below indicates an uplink ACK/NACK timeline, and when the user equipment has received a PDCCH and a PDSCH, which is scheduled by the corresponding PDCCH, from the base station in subframe #(n+k), this indicates that an uplink ACK/NACK respective to the received PDSCH is transmitted from subframe #n.

TABLE 6

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 7:
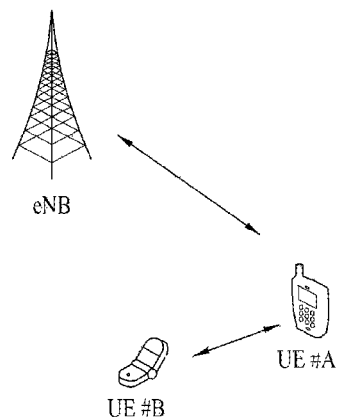
FIG. 7 illustrates a conceptual view of device-to-device communication.

FIG. 7 illustrates a conceptual view of device-to-device communication. More specifically, FIG. 7 shows an exemplary situation wherein communication between UE #A and the base station and device-to-device communication between UE #A and UE #B are performed simultaneously.

Referring to FIG. 7, in the perspective of a specific user equipment (or device), it is assumed that the device-to-device communication and the device-to-base station communication are separately performed in an aspect of a time resource area (e.g., subframe units), and this indicates that such operations are performed at different time points for a signal being transmitted from a specific user equipment to the base station and for a signal being transmitted from the corresponding user equipment to another user equipment. Additionally, the details of the present invention may be extensively applied to a case when, in the perspective to the specific user equipment (or device), the device-to-device communication and the device-to-base station communication are separately performed with respect to an aspect of a frequency resource area or an aspect of time/frequency resource area.

When performing the device-to-device communication, considering an (average) interference size that is being received when the corresponding communication is performed, it will be more efficient to use a time/frequency resource, wherein uplink communication between a device and the base station is established, instead of a time/frequency resource, wherein downlink communication between the base station and a device is established.

Generally, the uplink communication between a device and the base station is established based upon a low transmission power that is relatively lower than the downlink communication between the base station and a device, and, accordingly, this is because an (average) interference size being generated due to the uplink communication between the device and the base station is more likely to be smaller than an interference size being generated due to the down-link communication between the base station and the device. Conversely, in case the device-to-device communication is performed by using a time/frequency resource, which is designated for the purpose of the uplink communication between the device and the base station, in the perspective of the base station or the user equipment (or device), the device-to-device communication may be shown as a new form of interference, e.g., an interference respective to uplink data reception of the base station, interference respective to the device (or user equipment) receiving data in the device-to-device communication.

Therefore, in order to efficiently alleviate the interference that is generated between the uplink communication established between the device and the base station and the device-to-device communication, the base station may directly control the device-to-device communication. For example, in order to support the device-to-device communication, the base station may perform scheduling information transmission and transmission power control, and, in order to allow such operations of the base station to be efficiently performed, the devices (or user equipments) participating in the corresponding communication may also report ACK/NACK information, which indicates whether or not the data have been successfully received, or channel measurement information to the base station.

Meanwhile, the 3GPP LTE system uses a synchronous HARQ scheme in order to perform the uplink HARQ operations. The synchronous HARG scheme corresponds to a scheme that is realized when, in case initial transmission has failed, a subsequent re-transmission is realized at a time point that is decided by the system. More specifically, this indicates that a position (or time point), at which transmission/re-transmission (or uplink grant/PHICH timeline or uplink ACK/NACK timeline) of a specific HARQ process is realized, is decided in advance, and that this cannot be arbitrarily varied.

In case the base station schedules the device-to-device communication, the device-to-device communication requires an additional HARQ operation method other than the conventional HARQ operations. For example, when briefly describing the device-to-device communication between UE #A and UE #B, the base station transmit scheduling information for the device-to-device communication between UE #A and UE #B to UE #A, and, after receiving the transmitted scheduling information, UE #A transmits data to UE #B based upon the scheduling information, which had been received earlier, at a specific later time point that is decided in advance.

Herein, the scheduling information for the device-to-device communication between UE #A and UE #B, which is transmitted to UE #A from the base station, may also include an indicator indicating that the corresponding information has been transmitted for the device-to-device communication between UE #A and UE #B or an indicator indicating the performance of the device-to-device communication between UE #A and UE #B.

UE #B reports ACK/NACK information, which indicates whether or not demodulation of the data received from UE #A is successful, to the base station at a specific later time point that is decided in advance. Herein, the base station may indicate (or direct) whether or not to perform re-transmission of the corresponding data to UE #A based upon the ACK/NACK information, which is received from UE #B, and, most particularly, in case the synchronous HARQ scheme is used, scheduling information transmission (e.g., uplink grant/PHICH), data transmission, ACK/NACK transmission, and so on, are performed based upon a time point that is decided in advance.

The following proposed methods propose methods performed by a specific user equipment (or device) for efficiently operating HARQ operations of the corresponding user equipment (or device) under a device-to-base station communication as well as a device-to-device communication. Hereinafter, although the description will be given based upon a TDD system, if the HARQ timeline (e.g., PUSCH transmission→PHICH reception, PHICH/uplink grant reception→PUSCH (re-)transmission, PDSCH reception→uplink ACK/NACK transmission) is corrected to 4 ms, the methods may also be extensively applied to an FDD system.

First Embodiment

A first exemplary embodiment of the present invention proposes an example of setting up an HARQ cycle period of device-to-device communication as a multiple of an uplink communication HARQ cycle period of device-to-base station communication, in order to allow a specific user equipment (or device), under a device-to-base station communication as well as a device-to-device communication, to minimize the influence caused by the device-to-device communication on the HARQ processes, which are used for the uplink communication between the device and the base station of the corresponding user equipment (or device).

Herein, when it is assumed that a subframe, in which initial transmission is performed, corresponds to subframe #n, the HARQ cycle period signifies a time satisfying 'subframe #(m module 10)=subframe #(n module 10)' and that is required up to a time point when re-transmission is performed from subframe #m after subframe #n. For example, in uplink/downlink subframe configurations #1~#5, the HARQ cycle period of the device-to-device communication may be set to 20 ms, and, in uplink/downlink subframe configuration #0, the HARQ cycle period of the device-to-device communication may be set to 140 ms, and, in uplink/downlink subframe configuration #6, the HARQ cycle period of the device-to-device communication may be set to 120 ms.

Figure 8:
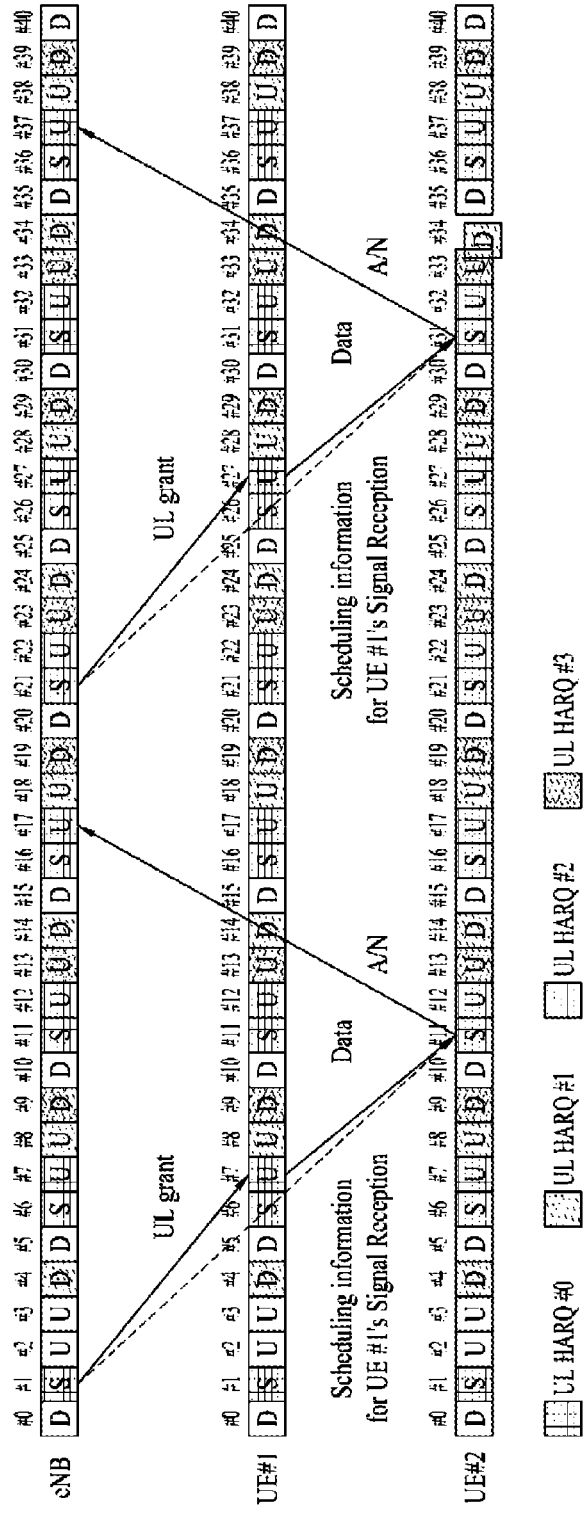
FIG. 8 illustrates an example of setting up an HARQ cycle period of device-to-device communication as a multiple of an uplink communication HARQ cycle period of device-to-base station communication according to a first exemplary embodiment of the present invention.

FIG. 8 illustrates an example of setting up an HARQ cycle period of device-to-device communication as a multiple of an uplink communication HARQ cycle period of device-to-base station communication according to a first exemplary embodiment of the present invention. Most particularly, in FIG. 8, it is assumed that uplink/downlink subframe configuration #1 including 4 HARQ processes is applied.

Referring to FIG. 8, it may be known that, in light of UE #2, a signal may be received by subframe #11 from UE #1, and that a signal may be received once again from UE #1 by a later subframe #31. Accordingly, it may be known that a device-to-device communication HARQ cycle period has been set to 20 ms, which corresponds to two times the HARQ cycle period of the uplink communication between the device and the base station, and that the number of HARQ processes, which are used for the uplink communication between the device and the base station, that are influenced by the corresponding device-to-device communication is equal to 1 (i.e., uplink HARQ process #0).

Second Embodiment

Under a situation, wherein a specific user equipment (or device) performs a device-to-base station communication as well as a device-to-device communication, the specific device may report the ACK/NACK information respective to the data received from a counterpart device of the device-to-device communication to the base station through a subframe satisfying the following conditions (or report to the counterpart device of the device-to-device communication).

(1) Including (or not including) a data reception time point within a specific HARQ process, which is interconnected with the data reception time point of the device-to-device communication, an uplink subframe being interconnected to a most approximate (or nearest) downlink subframe that follows.

(2) Including (or not including) subframe #n, which corresponds to a data reception time point, a nearest downlink subframe that follows, including subframe #(n+4) that follows. Most particularly, herein, the uplink subframe may be defined as all uplink subframes within the corresponding uplink/downlink subframe configuration, all existing uplink subframes being used for the purpose of ACK/NACK information transmission, and a specific subframe (or subframe of a specific position) being designated in advance through a higher layer signal or a physical layer signal, and so on.

(3) Including (or not including) a data reception time point within a specific HARQ process, which is predefined in advance, an uplink subframe being interconnected to a nearest downlink subframe that follows.

FIG. 8 illustrates an exemplary case of transmitting ACK/NACK from the subframe corresponding to (1), and, hereinafter, unless specifically mentioned otherwise, for simplicity in the description of the proposed methods, it will be assumed that the ACK/NACK is transmitted from the subframe corresponding to (1).

Third Embodiment

Under a situation, wherein a specific user equipment (or device) performs a device-to-base station communication as well as a device-to-device communication, a specific HARQ process, which is used in the device-to-device communication, may also be used in parallel in an uplink communication between a device and the base station in a format of having a time offset value applied thereto.

Most particularly, a cycle period of the specific HARQ process that is used in the uplink communication between a device and the base station may set to have the same value or a multiple value of a cycle period of a specific HARQ process that is used in the device-to-device communication, and, based upon the time offset value, which is set up (or determined) in advance, the device-to-device communication and the uplink communication between the device and the base station may use (or share) the specific HARQ process at different timings. Herein, information on the specific HARQ process that is shared by the device-to-device communication and the uplink communication between the device and the base station and information on the time offset value may be notified in advance by the base station to the user equipments (or devices) that are involved in the corresponding communication through a higher layer signal or a physical layer signal.

Additionally, the time offset value that is applied between the device-to-device communication and the uplink communication between the device and the base station may be defined to have a value that is ½ of the HARQ cycle period of the device-to-device communication, which is determined in advance. For example in a situation, wherein the first exemplary embodiment is applied, in uplink/downlink subframe configurations #1~#5, the time offset value may be set to 10 ms, and, in uplink/downlink subframe configuration #0, the time offset value may be set to 70 ms, and, in uplink/downlink subframe configuration #0, the time offset value may be set to 60 ms.

Figure 9:
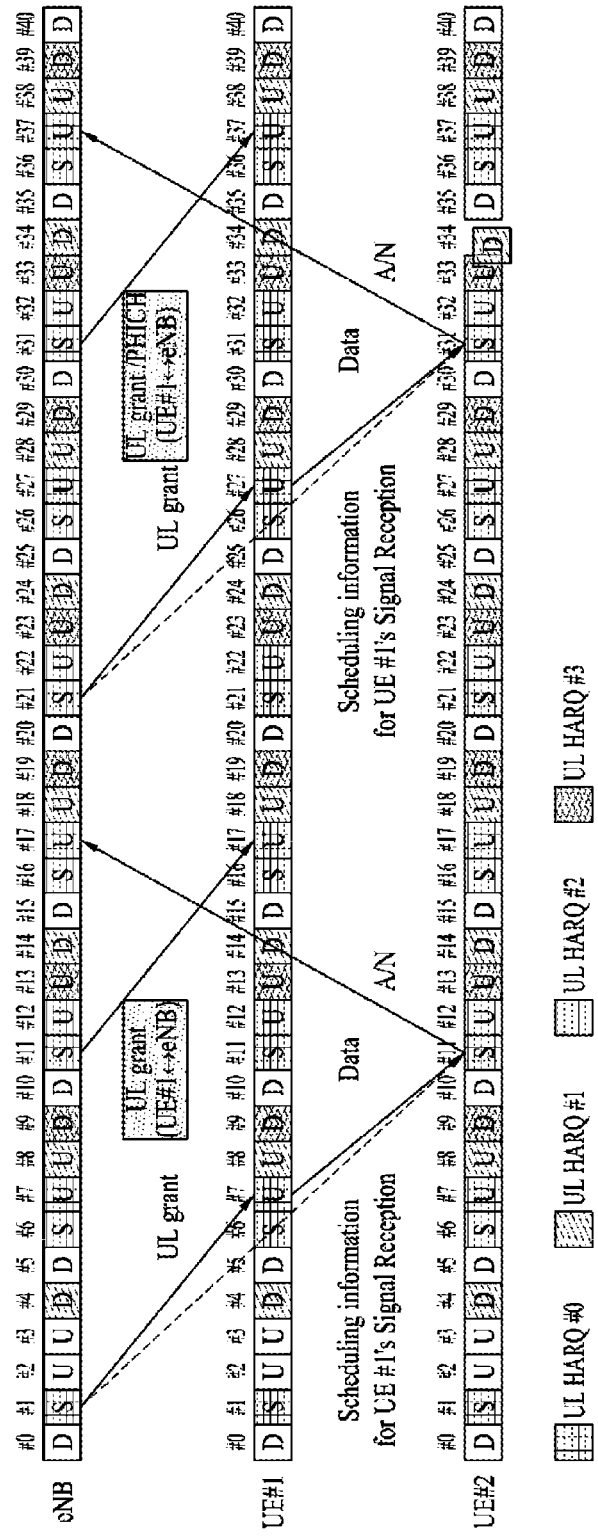
FIG. 9 illustrates an example of sharing a specific HARQ process, which is used in the device-to-device communication, in a device-to-base station communication in a format of having a time offset value applied thereto according to a third exemplary embodiment of the present invention.

FIG. 9 illustrates an example of sharing a specific HARQ process, which is used in the device-to-device communication, in a device-to-base station communication in a format of having a time offset value applied thereto according to a third exemplary embodiment of the present invention. Most particularly, in FIG. 9, it is assumed that uplink/downlink subframe configuration #1 including 4 HARQ processes is applied.

Referring to FIG. 9, it may be known that the time offset value that is applied between the device-to-device communication and the uplink communication between the device and the base station is set to be equal to 10 ms (i.e., a ½ value of 20 ms, which corresponds to the HARQ cycle period of the device-to-device communication). Additionally, it may be considered that, based upon the time offset of 10 ms, which is predetermined in advance, the device-to-device communication (UE #1⇆UE #2) and the uplink communication between the device and the base station (UE #1⇆eNB) both user (or share) the uplink HARQ process #0 at different timings.

Figure 10:
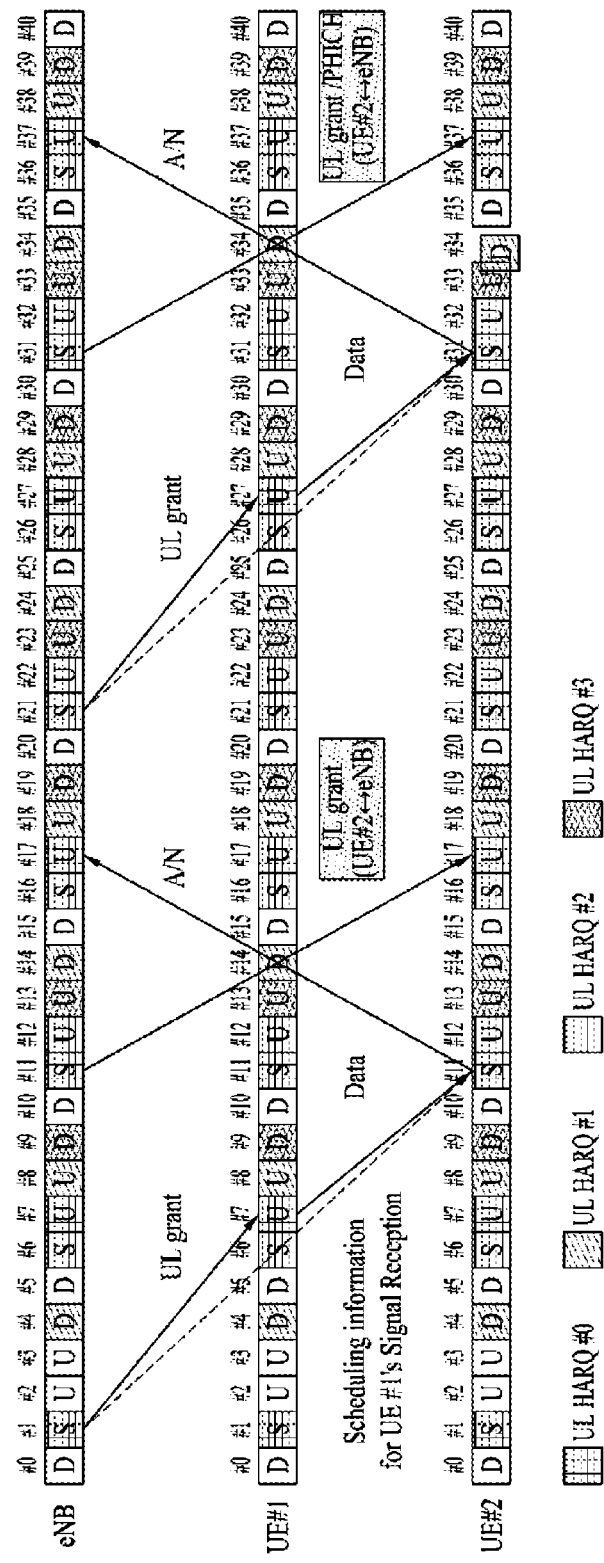
FIG. 10 illustrates another example of sharing a specific HARQ process, which is used in the device-to-device communication, in a device-to-base station communication in a format of having a time offset value applied thereto according to a third exemplary embodiment of the present invention.

FIG. 10 illustrates another example of sharing a specific HARQ process, which is used in the device-to-device communication, in a device-to-base station communication in a format of having a time offset value applied thereto according to a third exemplary embodiment of the present invention. Most particularly, in FIG. 10, it is assumed that uplink/downlink subframe configuration #1 including 4 HARQ processes is applied.

Referring to FIG. 10, it may be known that the time offset value that is applied between the device-to-device communication and the uplink communication between the device and the base station is set to be equal to 10 ms (i.e., a ½ value of 20 ms, which corresponds to the HARQ cycle period of the device-to-device communication). Additionally, it may be considered that, based upon the time offset of 10 ms, which is predetermined in advance, the device-to-device communication (UE #1⇆UE #2) and the uplink communication between the device and the base station (UE #2⇆eNB) both user (or share) the uplink HARQ process #0 at different timings. However, in FIG. 10, UE #2 has a capability (CAPABILITY) of simultaneously transmitting PUSCH and PUCCH, and it is provided that activation of such capability should already be determined.

Fourth Embodiment

Under a situation, wherein a specific user equipment (or device) performs a device-to-base station communication as well as a device-to-device communication, among the user equipments (or devices) participating in the device-to-device communication, a device that receives data from another specific device may be assigned in advance with a rule allowing scheduling information respective to the corresponding data (e.g., radio resource position information, MCS (Modulation and Coding Scheme) information, RV (redundancy version) information of transmission data, NDI (new data indicator) information, antenna port information, and so on) from "an uplink grant transmission subframe, which is most approximate (or nearest) to its previous subframe including (or its previous subframe not including) the corresponding data reception time point or a downlink standalone (DL standalone) subframe or downlink subframes (all downlink subframes within the uplink/downlink subframe configurations)" or from "a time point at which the base station notifies the scheduling information for the device-to-device communication to the data transmitting device (or user equipment)". Herein, a downlink standalone subframe refers to a subframe to which an uplink grant for uplink data transmission of a specific time point has not been transmitted.

Additionally, the user equipment (or device) that receives data from a specific user equipment may perform blind decoding (BD) on specific subframes, which are based upon a predetermined rule, in order to receive scheduling information respective to the corresponding data. During the blind decoding process, when scheduling information including an indicator signifying the scheduling information respective to the device-to-device communication is detected, the specific user equipment receives data from another user equipment based upon the corresponding scheduling information (e.g., information on a user equipment transmitting/receiving data, information on an area/position of resource being used for the data transmission). Furthermore, a subject transmitting the scheduling information may correspond to a base station controlling the device-to-device communication or another user equipment transmitting data to the specific user equipment.

Additionally, a scope of an uplink grant transmission subframe, to which the above-described scheduling information is transmitted, may be limited to uplink grant transmission downlink subframes belonging to a specific HARQ process timeline, which is used for the device-to-device communication, or may correspond to all uplink grant downlink subframes, which are decided by the predetermined uplink/downlink subframe configurations. Most particularly, FIG. 8 to FIG. 10 correspond to examples respective to the former method, i.e., a case when the scope is limited to uplink grant transmission downlink subframes belonging to a specific HARQ process timeline, which is used for the device-to-device communication.

Figure 11:
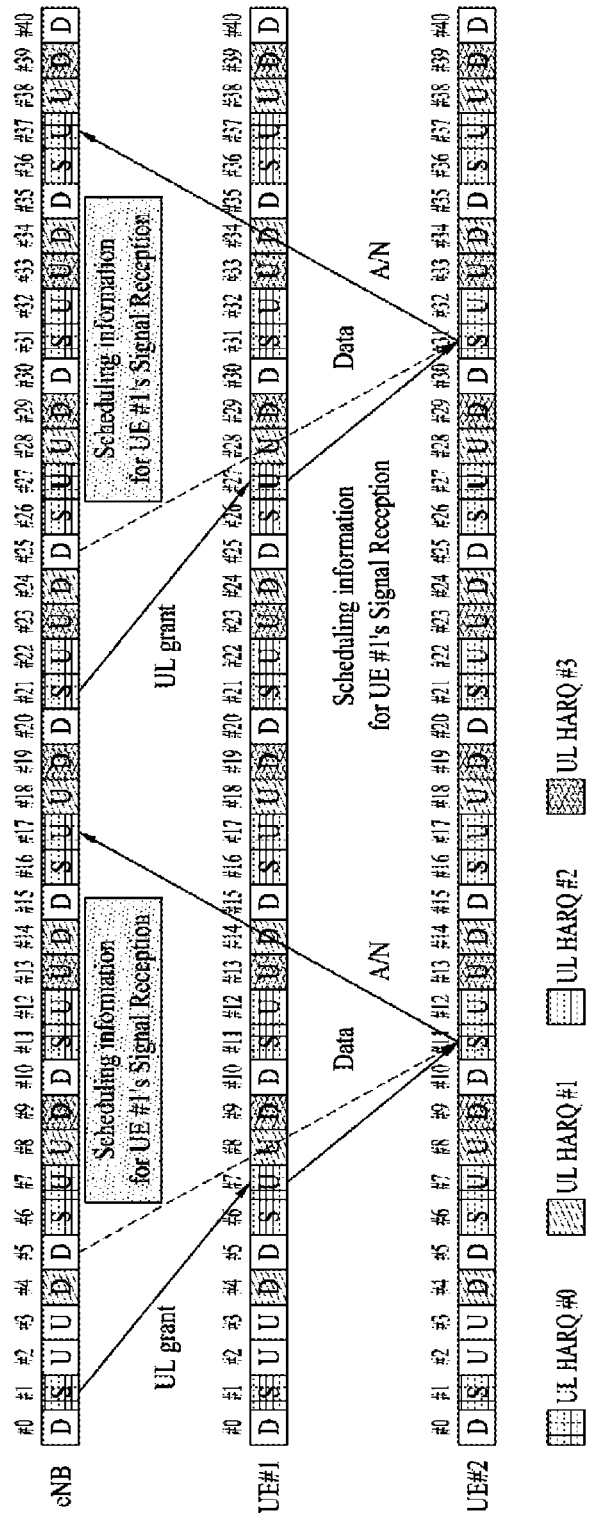
FIG. 11 and FIG. 12 respectively illustrate exemplary uplink grant transmission downlink subframes, to which scheduling information for the device-to-device communication is being transmitted, according to a fourth exemplary embodiment of the present invention.
Figure 12:
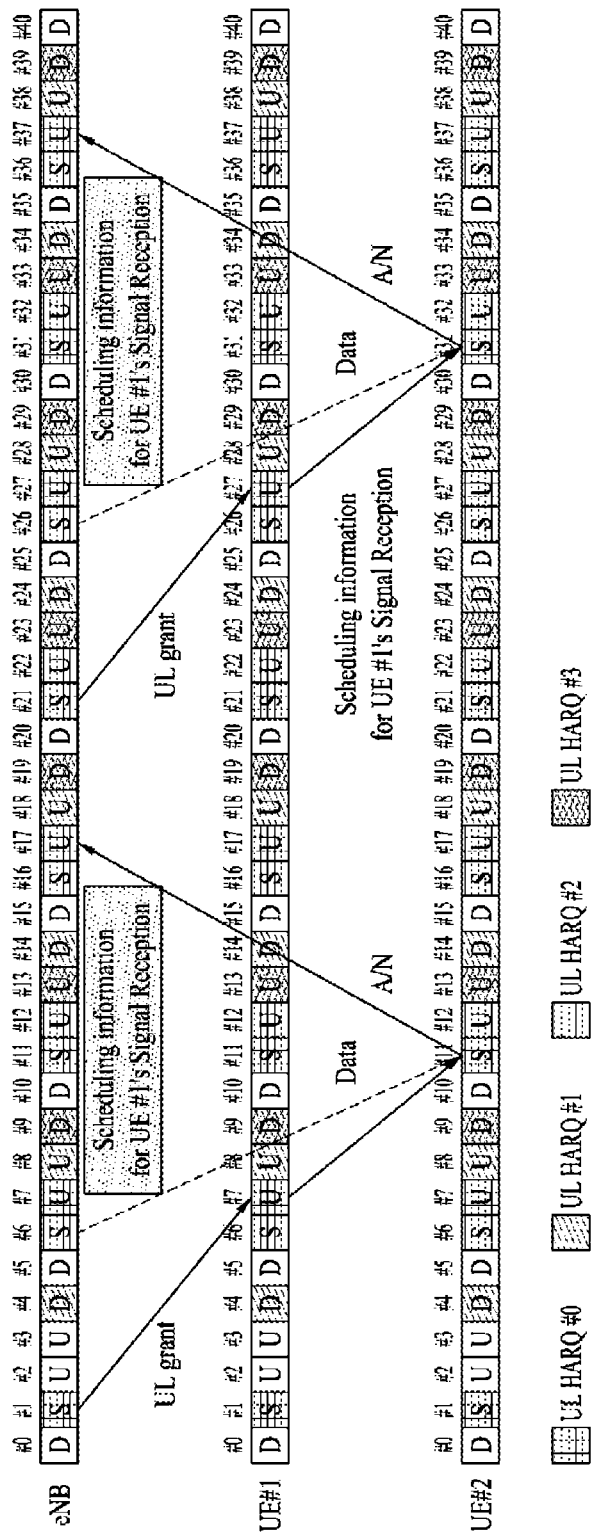

FIG. 11 and FIG. 12 respectively illustrate exemplary uplink grant transmission downlink subframes, to which scheduling information for the device-to-device communication is being transmitted, according to a fourth exemplary embodiment of the present invention. Most particularly, in FIG. 11 and FIG. 12, it is assumed that uplink/downlink subframe configuration #1 including 4 HARQ processes is applied.

FIG. 11 illustrates a case when the base station notifies scheduling information respective to the corresponding data to a user equipment receiving data from the specific user equipment at a nearest downlink standalone subframe before and including the corresponding data reception time point. Accordingly, it may be known that the scheduling information allowing UE #2 to receive data from UE #1 via device-to-device communication is transmitted by the eNB at subframe #5 and subframe #25.

Additionally, FIG. 12 illustrates a case when the base station notifies scheduling information respective to the corresponding data to a user equipment receiving data from the specific user equipment at nearest (or most approximate) downlink subframes (all downlink subframes within the uplink/downlink subframe configurations) before and including the corresponding data reception time point. Most particularly, in FIG. 12, it may be known that subframe #6 corresponds to the nearest uplink grant reception downlink subframe to subframe #7. Therefore, it may be known that the scheduling information allowing UE #2 to receive data from UE #1 via device-to-device communication is transmitted by the eNB at subframe #6 and subframe #26.

Fifth Embodiment

Under a situation, wherein a specific user equipment (or device) performs a device-to-base station communication as well as a device-to-device communication, the base station may independently notify each of the uplink/downlink subframe configurations for the device-to-base station communication and the uplink/downlink subframe configurations for the device-to-device communication to the specific user equipment through a higher layer signal or a physical layer signal.

Alternatively, the uplink/downlink subframe configurations for the device-to-base station communication may be defined to be implicitly considered as uplink/downlink subframe configurations, which are configured through a system information block (SIB). And, in this case, the base station may independently notify the user equipment of only the uplink/downlink subframe configurations for the device-to-device communication through a higher layer signal or a physical layer signal.

Meanwhile, the uplink/downlink subframe configurations for the device-to-device communication may only be used for the purpose of having the specific user equipment receive data from another user equipment or having the specific user equipment report ANK/NACK information respective to the corresponding data reception, and, in case the corresponding user equipment transmits data to another user equipment (or base station), operations may be performed based upon the uplink/downlink subframe configurations for the device-to-base station communication. This is most particularly efficient in a situation, wherein the base station controls the device-to-device communication (i.e., a situation, wherein the base station (directly) controls data transmission of the specific user equipment to another user equipment).

More specifically, between the uplink/downlink subframe configurations for the device-to-device communication and the uplink/downlink subframe configurations for the device-to-base station communication, an uplink subframe collection (or group) of the uplink/downlink subframe configurations for the device-to-device communication may be set to belong to an uplink subframe collection (or group) of the uplink/downlink subframe configurations for the device-to-base station communication or to satisfy an equivalent relationship. Alternatively, a downlink subframe collection (or group) of the uplink/downlink subframe configurations for the device-to-base station communication may be set to belong to a downlink subframe collection (or group) of the uplink/downlink subframe configurations for the device-to-device communication or to satisfy an equivalent relationship.

Herein, the user equipment receiving data from the specific user equipment may transmit the ACK/ANCK information respective to the corresponding data reception to the base station (or a target user equipment of the device-to-device communication) by using an HARQ timeline based upon the uplink/downlink subframe configurations for the device-to-device communication.

Additionally, as an uplink subframe in the uplink/downlink subframe configurations for the device-to-base station communication, a scope of the subframe performing the device-to-device communication may be limited to a time point (or position) corresponding to a downlink subframe in the uplink/downlink subframe configurations for the device-to-device communication. According to the above-described method, in the device-to-device communication, in case a specific user equipment is required to receive data from another user equipment based upon the uplink/downlink subframe configurations for the device-to-device communication in subframe #n, and in case the corresponding user equipment is required to transmit uplink data to the base station or to transmit data to a specific user equipment based upon the uplink/downlink subframe configurations for the device-to-base station communication in subframe #(n+1), by determining subframe #n as a special subframe (or shortened downlink subframe) of the TDD system, which is defined in advance, a reception-transmission switching time (or TA (timing advance) for data transmission from subframe #(n+1), which will be performed in a later process, may be ensured. Herein, the special subframe or the shortened downlink subframe represents a subframe, which is defined in advance, and which has a relatively lower number of OFDM symbols that are used for the purpose of transmitting downlink data as compared to a normal downlink subframe.

Meanwhile, in case the specific user equipment transmits uplink data to the base station from a following subframe, operations may be performed based upon the uplink/downlink subframe configurations for the device-to-base station communication, which are configured in advance, and, in case the specific user equipment transmits data to another user equipment from a following subframe, operations may be performed based upon the uplink/downlink subframe configurations for the device-to-device communication, which are configured in advance (or the uplink/downlink subframe configurations for the device-to-base station communication, which are configured in advance).

Alternatively, in case the specific user equipment receives data at another user equipment in subframe #n (e.g., uplink subframe #n or downlink subframe #n), and in case the following subframe #(n+1) is configured for the purpose of uplink data transmission, the subframe #(n+1) may set up a rule in advance so that the subframe #(n+1) is not used for the purpose of transmitting uplink data. Herein, in case the subframe #(n+1) corresponds to a (non-)periodic SRS transmission time point or a time point at which a (non-)periodic channel status information (CSI) report is performed, SRS, CSI transmission may be exceptionally performed, or SRS, CSI transmission may be omitted, or may be (re-)transmitted from an uplink subframe that is available for usage in a later process. Additionally, the scope of an uplink subframe in which (non-)periodic SRS (re-)transmission is performed may be set to all subframes determined for the purpose of uplink or may be limited to uplink subframes that are used for the purpose of (non-)periodic SRS (re-)transmission. This method may also be extensively applied to a case when the base station additionally notifies the uplink/downlink subframe configurations for the device-to-device communication to the user equipment, or also to a case when the device-to-base station communication and the device-todevice communication are performed based upon an uplink/downlink subframe configuration.

Furthermore, a relationship between the uplink/downlink subframe configurations for the device-to-device communication and the uplink/downlink subframe configurations for the device-to-base station communication may be determined, so that an uplink subframe collection (or group) of the uplink/downlink subframe configurations for the device-to-base station communication can be included in or identical to an uplink subframe collection (or group) of the uplink/downlink subframe configurations for the device-to-device communication. Alternatively, settings may be made, so that a downlink subframe collection (or group) of the uplink/downlink subframe configurations for the device-to-base station communication can be included in or identical to a downlink subframe collection (or group) of the uplink/downlink subframe configurations for the device-to-device communication.

In the proposed methods presented above, the relationship between the groups may simply signify a relation of inclusion between position (or number) of uplink/downlink subframes or may also signify a relation of inclusion within an HARQ timeline, which consists of uplink/downlink subframes (e.g., uplink ACK/NACK timeline, PHICH/uplink grant timeline, and so on).

Additionally, in case the base station additionally notifies the user equipment (or device) of the uplink/downlink subframe configurations for the device-to-device communication, configurations respective to the (non)periodic SRS transmission (or the (non-)periodic CSI reporting) may be defined based upon the uplink/downlink subframe configurations that are configured for the device-to-base station communication, or the uplink/downlink subframe configurations for the device-to-device communication and the uplink/downlink subframe configurations for the device-to-base station communication may be simultaneously defined based upon a time point, which is determined as an uplink subframe.

Figure 13:
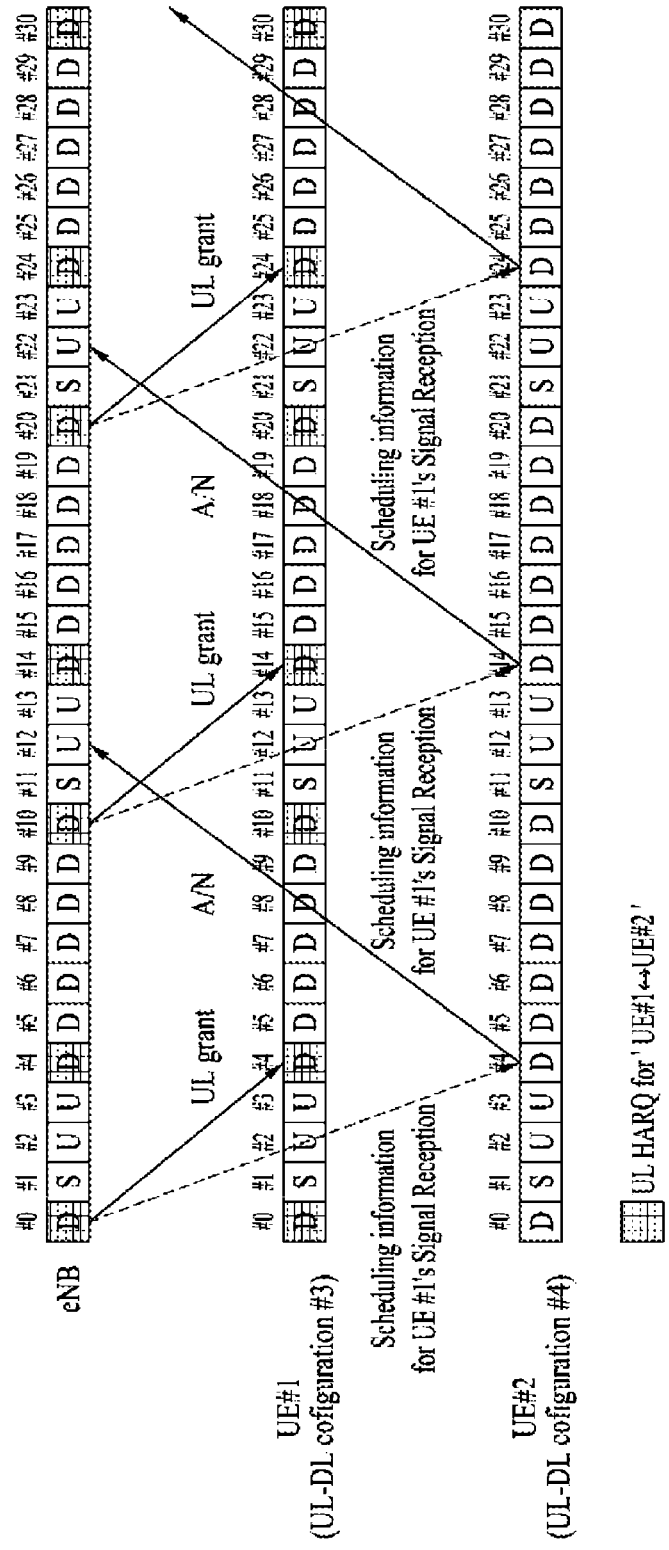
FIG. 13 illustrates exemplary uplink HARQ operations according to a fifth exemplary embodiment of the present invention.

FIG. 13 illustrates exemplary uplink HARQ operations according to a fifth exemplary embodiment of the present invention. Most particularly, in FIG. 13, a case when settings are made, so that an uplink subframe collection (or group) of the uplink/downlink subframe configurations for the device-to-base station communication can be included in or identical to an uplink subframe collection (or group) of the uplink/downlink subframe configurations for the device-to-device communication, is assumed.

Additionally, it is also assumed that the uplink/downlink subframe configuration for the device-to-base station communication is set to uplink/downlink subframe configuration #3, wherein 3 uplink HARQ processes are used, and that the uplink/downlink subframe configuration for the device-to-device communication is set to uplink/downlink subframe configuration #4, wherein 2 uplink HARQ processes are used.

Referring to FIG. 13, it may be known that when UE #1 transmits data to UE #2, operation is performed based upon uplink/downlink subframe configuration #3, and, when UE #2 receives data from UE #1, operation is performed based upon uplink/downlink subframe configuration #4.

Moreover, in case UE #2 receives data from UE #1, the ACK/NACK information respective to the corresponding data may be transmitted to the base station by using an HARQ timeline, which is based upon uplink/downlink subframe configuration #4, and a rule is set up in the communication between UE #1 and UE #2, so that the communication between UE #1 and UE #2 can be performed at a time point, when uplink/downlink subframe configuration for the device-to-base station communication corresponds to an uplink subframe, and when the uplink/downlink subframe configuration for the device-to-device communication corresponds to a downlink subframe. Most particularly, in case the fifth exemplary embodiment is applied herein, in the perspective of UE #1, the number of HARQ processes being used in the uplink communication between the device and the base station, which is influenced by the device-to-device communication, is equal to 1, and the data communication cycle period, i.e., the data reception cycle period of the device-to-device communication becomes 10 ms.

Sixth Embodiment

Under a situation, wherein a specific user equipment (or device) performs a device-to-base station communication as well as a device-to-device communication, the base station may additionally notify HARQ timeline information for the device-to-device communication (e.g., uplink ACK/NACK timeline, PHICH/uplink grant timeline, PUSCH (re-)transmission timeline, and so on) to a specific user equipment through a higher layer signal or a physical layer signal.

Herein, the corresponding HARQ timeline information may be configured independently from the uplink/downlink subframe configuration, which is configured in advance for the device-to-device communication, and the HARQ timeline for the device-to-device communication, which is additionally notified by the base station, may reuse all or some of the HARQ timelines of candidates that are available to be configured as the uplink/downlink subframe configuration (e.g., uplink/downlink subframe configuration #0~uplink/downlink subframe configuration #6) or may be realized as an HARQ timeline, which is newly defined in advance.

Furthermore, with the exception for the additionally notified HARQ timeline, the remaining HARQ timelines may be defined to implicitly follow the HARQ timeline of the uplink/downlink subframe configuration, which is configured in advance for the device-to-device communication.

Figure 14:
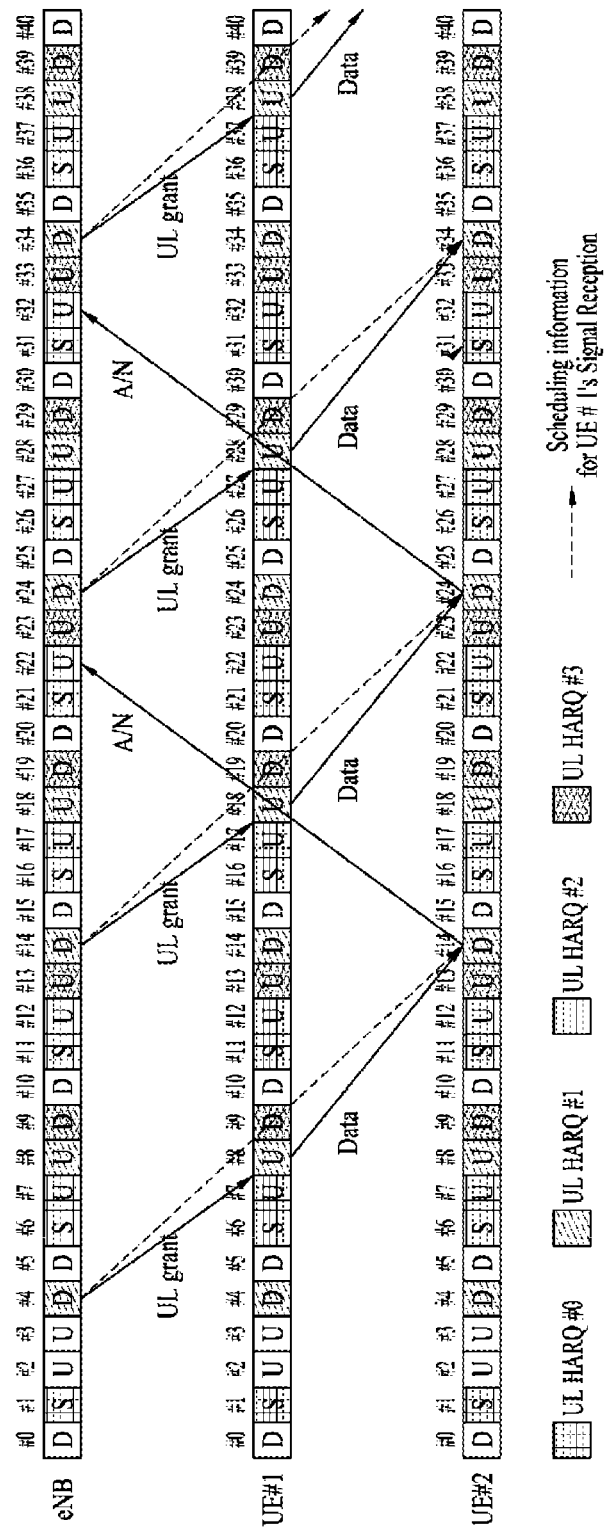
FIG. 14 illustrates exemplary uplink HARQ operations according to a sixth exemplary embodiment of the present invention.

FIG. 14 illustrates exemplary uplink HARQ operations according to a sixth exemplary embodiment of the present invention. Most particularly, as a situation corresponding to uplink/downlink subframe configuration #1, which includes 4 HARQ processes, it is assumed in FIG. 14 that, the base station has additionally notified ACK/NACK information respective to the reception of data corresponding to a case when data are received from another user equipment to the specific user equipment through a higher layer signal or a physical layer signal, so that settings can follow an uplink ACK/NACK timeline of uplink/downlink subframe configuration #2, which includes 2 uplink HARQ processes.

Referring to FIG. 14, when UE #2 has received data from UE #1 in subframe #8, it may be known that uplink ACK/NACK respective to the corresponding data reception is transmitted to the base station from subframe #22, based upon the uplink ACK/NACK timeline of uplink/downlink subframe configuration #2 instead of the uplink ACK/NACK timeline (i.e., subframe #18) of uplink/downlink subframe configuration #1. Accordingly, in case the sixth exemplary embodiment is applied, based upon the uplink HARQ process #1, the data communication cycle period, i.e., the data reception cycle period of the device-to-device communication becomes 10 ms.

As an additional method, by intentionally setting up a subframe-unit (or a specific predefined unit) time offset between the uplink/downlink subframe configuration for the device-to-base station communication and the uplink/downlink subframe configuration for the device-to-device communication, two different types of communication may be efficiently performed. For example, the device-to-base station communication and the device-to-device communication may be operated based upon each time offset, which is respectively set up in advance for the corresponding communication. Such method may be extensively applied to a case when the base station additionally notifies the uplink/downlink subframe configuration for the device-to-device communication to the user equipment, or to a case when the device-to-base station communication and the device-to-device communication are performed based upon one uplink/downlink subframe configuration.

In an environment applying a carrier aggregation method, the above-described exemplary embodiments of the present invention may also be extensively applied to a case when a specific component carrier (or cell) is used for the device-to-device communication, or to a case when a specific component carrier (or cell) is used for the device-to-base station communication and another component carrier (or cell) is used for the device-to-device communication. Additionally, the above-described exemplary embodiments of the present invention may also be extensively applied to a case when device-to-device communication is performed based upon an extension carrier, in an environment applying the carrier aggregation method.

In addition to a situation, wherein the base station controls the device-to-device communication, the above-described exemplary embodiments of the present invention may also be extensively applied to a situation, wherein the device-to-device communication is performed based upon a predecided rule without the control of the base station.

Furthermore, the above-described proposed methods may also be extensively applied to a case when a specific user equipment receives data, which are transmission from the base station, through a relay node, or to a case when the specific user equipment receives data from another specific user equipment, which is predefined in advance (i.e., UE relay method).

Figure 15:
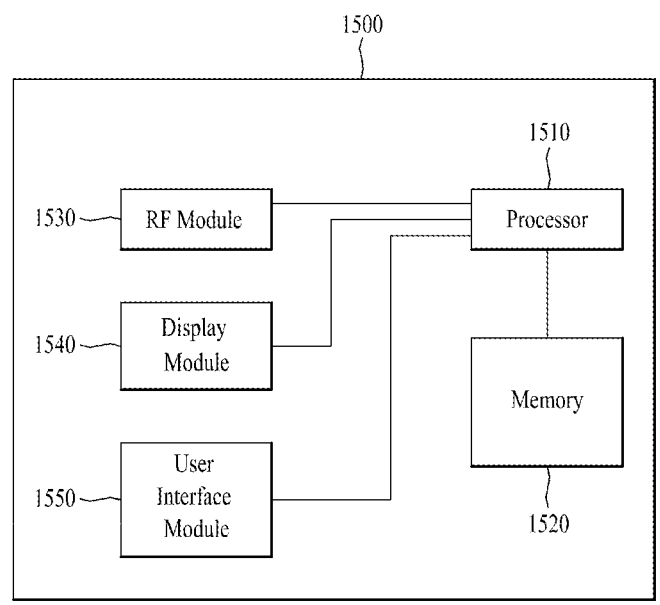
FIG. 15 illustrates a block view showing the structures of a communication device according to an exemplary embodiment of the present invention.

FIG. 15 illustrates a block view showing the structures of a communication device according, to an exemplary embodiment of the present invention.

Referring to FIG. 15, a communication device (1500) includes a processor (1510), a memory (1520), an RF module (1530), a display module (1540), and a user interface module (1550).

The communication device (1500) is an exemplary illustration provided to simplify the description of the present invention. Also, the communication device (1500) may further include necessary modules. Also, in the communication device (1500), some of the modules may be divided into more segmented modules. Referring to FIG. 15, an example of the processor (1510) is configured to perform operations according to the embodiment of the present invention. More specifically, reference may be made to the description of FIG. 1 to FIG. 14 for the detailed operations of the processor (1510).

The memory (1520) is connected to the processor (1510) and stores operating systems, applications, program codes, data, and so on. The RF module (1530) is connected to the processor (1510) and performs a function of converting baseband signals to radio (or wireless) signals or converting radio signals to baseband signals. In order to do so, the RF module (1530) performs analog conversion, amplification, filtering, and frequency uplink conversion or inverse processes of the same. The display module (1540) is connected to the processor (1510) and displays diverse information. The display module (1540) will not be limited only to the example given herein. In other words, generally known elements, such as LCD (Liquid Crystal Display), LED (Light Emitting Diode), OLED (Organic Light Emitting Diode) may also be used as the display module (1540). The user interface module (1550) is connected to the processor (1510), and the user interface module (1550) may be configured of a combination of generally known user interfaces, such as keypads, touchscreens, and so on.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific, embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

Industrial Applicability

As described above, the method for performing HARQ for device-to-device communication in a wireless communication system and the device for the same have been described based upon an example that may be applied to a 3GPP LTE system. However, in addition to the 3GPP LTE system, the exemplary embodiment of the present invention may also be applied to diverse wireless communication systems.

What is claimed is:

1. A method of a first user equipment for performing HARQ (Hybrid Automatic Repeat and reQuest) for device-to-device communication in a wireless communication system, the method comprising:
    receiving scheduling information for performing signal transmission to a second user equipment from a base station;
    transmitting data on a first subframe to the second user equipment in accordance with the scheduling information;
    receiving a response signal from the base station on a second subframe located between the first subframe and a third subframe, wherein the response signal is transmitted by the second user equipment in response to the transmitted data on the first subframe; and
    transmitting the data or new data on the third subframe to the second user equipment in accordance with the response signal,
    wherein an interval between the first subframe and the third subframe corresponds to a second HARQ cycle period for a second HARQ process between the first user equipment and the second user equipment,
    wherein a first HARQ cycle period for a first HARQ process between the first user equipment and the base station is set to a multiple of the second HARQ cycle period,
    wherein a predetermined time offset is applied to the first HARQ process and the second HARQ process, and
    wherein the predetermined time offset is set to half of the second HARQ cycle period.

2. The method of claim 1, wherein the second subframe corresponds to an uplink subframe interconnected to a nearest downlink subframe after the first subframe.

3. The method of claim 1, wherein the second subframe corresponds to a nearest subframe after the first subframe.

4. The method of claim 3, wherein the nearest subframe corresponds to an uplink subframe that is scheduled to transmit an ACK (Acknowledgement)/NACK (Negative-ACK) signal to the base station in uplink/downlink subframe configurations configured in the first user equipment.

5. The method of claim 1, wherein the base station transmits scheduling information for reception of the data on a fourth subframe to the second user equipment.

6. The method of claim 1, further comprising:
    receiving information related to the uplink/downlink subframe configurations for the device-to-device communication from the base station.

7. The method of claim 1, wherein an uplink subframe collection of the uplink/downlink subframe configurations for the device-to-device communication is included in or identical to an uplink subframe collection of the uplink/downlink subframe configurations for the device-to-base station communication.

8. The method of claim 7, wherein the information related to the uplink/downlink subframe configurations for the device-to-base station communication is predetermined in advance through system information.

* * * * *